United States Patent [19]

Tominaga et al.

[11] 4,455,073
[45] Jun. 19, 1984

[54] CAMERA FILM DRIVE MOTOR CONTROL DEVICES

[75] Inventors: Shinji Tominaga; Ikushi Nakamura, both of Osaka, Japan

[73] Assignee: Minolta Camera Kabushiki Kaisha, Osaka, Japan

[21] Appl. No.: 368,352

[22] Filed: Apr. 14, 1982

[30] Foreign Application Priority Data

Apr. 29, 1981 [JP] Japan ................................. 56-65051

[51] Int. Cl.³ ............................................... G03B 1/12
[52] U.S. Cl. .............................................. 354/173.11
[58] Field of Search ........................................... 354/173

[56] References Cited

U.S. PATENT DOCUMENTS 3,946,409  3/1976  Toyada ................................. 354/173
4,122,471 10/1978  Takahata ............................. 354/173

*Primary Examiner*—Michael L. Gellner
*Attorney, Agent, or Firm*—Watson, Cole, Grindle & Watson

[57] ABSTRACT

A film wind-up and rewinding motor is connected in series with a resistor so that a voltage commensurate with the motor current appears across the resistor. A level shift circuit shifts the voltage by a given level to generate a voltage signal for switching operation of a transistor. A voltage detecting circuit having a transistor or a bipolar transistor type voltage comparator detects the level of the voltage signal and generates a signal to energize an electromagnet for opening a power switch of the motor when the motor current varies due to forced rotational stopping of the motor or decreased load rotation of the motor causing the voltage signal to rise or drop to a given level.

7 Claims, 5 Drawing Figures

CAMERA FILM DRIVE MOTOR CONTROL DEVICES

BACKGROUND OF THE INVENTION

1. Field of the Invention

The present invention relates to camera film drive motor control devices, and more particularly to such control devices which electrically detect variations in current flow through the motor for purposes of inversion or stop control.

2. Prior Art

Camera film wind-up, when performed electrically with a motor, requires current as large as approximately 1A to be normally supplied to the motor. This current level makes the load too large for batteries used in an ordinary compact camera as a film drive motor power source. Particularly when the motor rotation is forced to stop due to film over-tension of the film with film wind-up after completion of exposure on the last frame, the motor current becomes more than double the motor current during the normal motor rotation. This state, not corrected or removed, unnecessarily reduces the life of the camera batteries. Therefore, to minimize battery power consumption, it is necessary to immediately cut off the power supply to the motor when the motor rotation is forced to stop. Such forced stopping of motor rotation occurs also in the case of failure of a normal film wind-up operation due to an accident.

U.S. Pat. No. 3,946,409 discloses a film drive motor control device which, based on the fact that motor current varies with the variation in load to the motor, detects the load increase as voltage variations across a series connected resistor to cut off the power supply to the motor. As shown in FIG. 1, resistor 2 is connected in series to film wind-up motor 1 to apply the voltage developed at a node between resistor 2 and motor 1 to the emitter of transistor 3. Moreover, a predetermined level of voltage is applied through the intermediate terminal of variable resistor 4 to the base of transistor 3. The predetermined voltage level allows transistor 3 to turn on with the emitter potential kept sufficiently lower than the base potential when a normal film wind-up is effected, while turning off transistor 3 with a rise in the emitter potential due to the motor current increase caused by the forced stop rotation of motor 1. When transistor 3 turns off, relay 6 is excited to open switch 5 connected in series to motor 1, whereby the current flow to motor 1 is cut off.

In this prior art circuit arrangement, the electric power which is consumed by resistor 2 is unnecessary for the purpose of the motor drive. Especially when the circuitry is driven with such a low-voltage power source as 3V, a voltage drop caused by resistor 2 is to be minimized, e.g., by reducing the resistance value of resistor 2 in order to make the most of the power source. When, however, a battery whose internal resistance increases as its capacity drops, such as when an AA size manganese battery is used, the available motor current range is limited if the circuit arrangement is required to ensure the use of both a brand new battery and an old one consumed to its operative limit. For example, the motor current during a normal film wind-up is approximately 0.8A with a new battery and approximately 0.5A with an old one consumed to its operative limit. In contrast thereto, when the motor rotation is forced to stop, the motor current becomes 3.0A with the new battery and 1.0A with the old one. In this case, the respective circuit constants of resistors 2 and 4 and transistor 3 should be selected so that they may discriminate 0.8A from 1.0A motor current for the detection of stopping the motor rotation.

Since, however, the range of emitter potential variations becomes narrower as the voltage drop caused by resistor 2 is reduced, as described earlier, transistor 3 is required to have a sharp switching characteristic so that it can respond to a slight emitter potential variation. As is well known, however, the switching characteristic of a single transistor is not sharp enough. Additionally, the threshold level for the switching operation of a transistor varies with the temperature. Accordingly, these switching and temperature characteristics of the transistor necessarily determine the acceptable lower limit of the voltage drop caused by resistor 2, whereby developing any lower voltage drop by resistor 2 would make the prior art circuit arrangement unreliable and improper for practical use.

SUMMARY OF THE INVENTION

It is accordingly an object of the present invention to provide a highly reliable film drive motor control device to stop a film drive motor for practical use in a camera.

Another object of the present invention is to provide a camera film drive motor control device which can save battery power consumption.

To accomplish these objects, the camera film drive motor control device of the present invention includes a level shift circuit which shifts the voltage appearing across a resistor connected in series to a film drive motor by a given level, to generate a voltage signal having a level suitable for the switching operation of a control transistor. A voltage detecting circuit detects the level of the voltage signal and generates a signal to stop power supply to the motor when the voltage signal reaches a given reference level as a result of variation in the motor current caused by the forced rotational stopping of the motor or by a decreased rotational load of the motor. Since the level of the voltage signal is sufficiently high for switching operation of the transistor even with a low voltage drop caused by the resistor connected in series to the motor, it is easy for the voltage detecting circuit to detect the variation in the level of the voltage signal, i.e., to discriminate normal rotation of the motor from the forced rotational stopping of the motor, or from the decreased rotational load of the motor. Thus, the camera film drive motor control device of the present invention is highly reliable in its operation to stop the motor and proper for practical use. Additionally, since it is unnecessary to cause a high level voltage drop by the resistor during normal rotation of the motor, the power consumption of the resistor can be saved to a considerable extent, making it possible to use a compact battery source of relative small capacity for the motor drive.

The above and other objects and features of the present invention will become more apparent from the following description of preferred embodiments of the best mode of carrying out the invention taken in conjunction with the accompanying drawings.

DETAILED DESCRIPTION OF THE PREFERRED EMBODIMENTS

Figure 2:
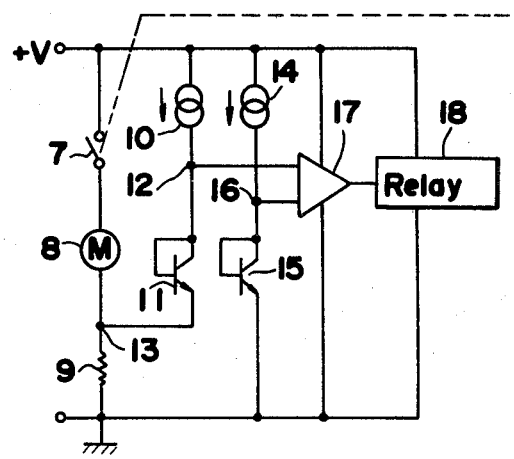
FIG. 2 is a circuit diagram illustrating the basic circuit arrangement of the present invention.

With reference to FIG. 2, which shows the basic circuit arrangement of the present invention, switch 7, film wind-up motor 8 and resistor 9 are connected in series across the power supply terminals. Switch 7 is part of a relay which responds to the output of a circuit to be described later. Resistor 9 is set to a resistance value, e.g., $0.1\Omega$, so that a voltage of 80mV appears across resistor 9 with the current of 0.8A, and 100mV, i.e., 20mV higher than that voltage, for a current of 1A. Constant-current source 10 and diode 11 together constitute a level shift circuit. The voltage developed at node 12 between constant current source 10 and diode 11 is higher than the voltage at node 13 of film wind-up motor 8 and resistor 9 by a constant voltage appearing across diode 11. When the current of constant-current source 10 is set to, e.g., 10uA so that the voltage developed across diode 11 may be, e.g., 500mV, the voltage of 500mV to 600mV appears at node 12.

Figure 1:
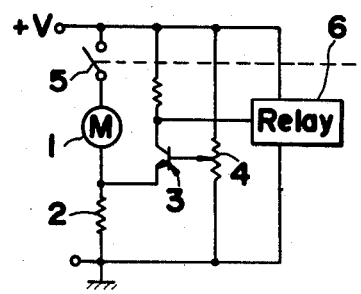
FIG. 1 is a circuit diagram showing a prior art film drive motor control circuit.
Figure 5:
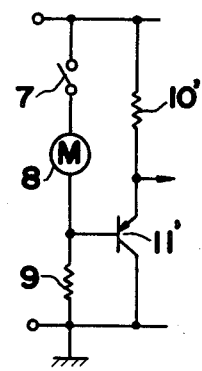
FIG. 5 is a circuit diagram showing the principal part of a modification of the film drive motor control circuit according to the present invention.

Current source 14 and diode 15 form a reference voltage generating circuit which generates a constant voltage, e.g., 600mV at node 16. Voltage comparator 17 is a known bipolar transistor type circuit whose operation is set to respond to the input level of 600mV. The reference voltage generating circuit and voltage comparator 17 form a voltage level detecting circuit, which generates a detection signal of a "High" voltage level when the rotation of film wind-up motor 8 is forced to stop due to film over-tension during a film wind-up operation after completion of exposure of the last frame, causing current more than 1A to flow through resistor 9 and a voltage level higher than 600 mV to develop at node 12. When the "High" level voltage is generated by the voltage level detecting circuit, relay circuit 18 opens and holds switch 7 open. The current value of constant-current source 10 flowing through diode 11 to resistor 9 is negligibly smaller ($10uA \times 0.1\Omega = 1uV$) as compared with the motor current, and thus the voltage developed at resistor 9 is regarded as dependent only on the current flow to film wind-up motor 8. Therefore, the voltage variation at node 13 is developed at node 12. In this case, both the shifted voltage of the level shift circuit and the reference voltage of the reference voltage generating circuit are generated by diodes 11 and 15 and these voltages vary almost equally in the same direction even if the ambient temperature changes. As a result, the switching level of voltage comparator 17 remains unchanged. It is to be noted that the constant-current source 10 in the circuit of FIG. 2 may be replaced by a resistor as well as diode 11 by a resistor. Furthermore, the voltage level detecting circuit can be replaced by a simple transistor circuit, as detailed in FIG. 3. Furthermore, diode 11 may be replaced by the PN junction across the emitter and the base of PNP transistor 11' as shown in FIG. 5.

Figure 3:
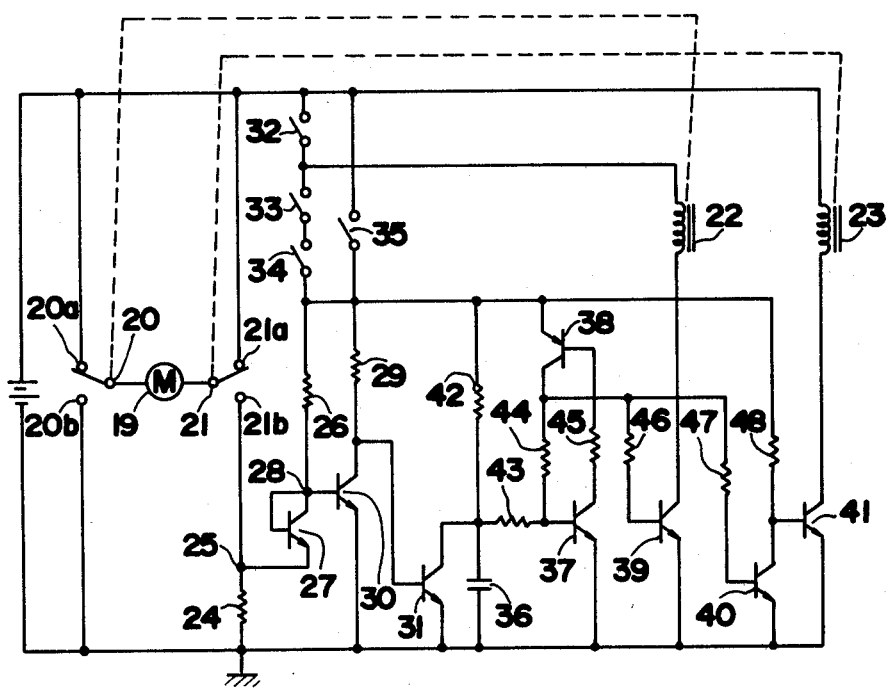
FIG. 3 is a circuit diagram of a film drive motor control circuit in accordance with an embodiment of the present invention.

The circuit of FIG. 3 detects the condition where the film has been wound up to the last wind-up position imposing an over-load on the motor, and cuts off the power supply to the film wind-up motor, as well as thereafter actuating a switch for the motor rotation to be inverted for automatic film rewinding. With reference to FIG. 3, switches 20 and 21 connected across film wind-up rewinding motor 19 constitute relays together with electromagnets 22 and 23, respectively. When electromagnets 22 and 23 are de-energized, switches 20 and 21 are changed to contacts 20a and 21a, respectively, as shown in FIG. 3. When electromagnets 22 and 23 are energized, switches 20 and 21 are changed to contacts 20b and 21b, respectively. Electromagnet 22 is energized with the power supplied from power source E through switch 32 and transistor 39, the operations of which are described later, while electromagnet 23 is energized through transistor 41. It should be noted that switch 20, electromagnets 22, switch 21 and electromagnet 23 forming the relays may be replaced by semiconductor switches such as power transistors.

First, film wind-up is carried out with electromagnet 22 de-energized and switch 20 at contact 20a, as well as electromagnet 23 energized and switch 21 at contact 21b. At this time, the current flow through motor 19 is supplied to resistor 24 to develop a voltage at node 25 between motor 19 and resistor 24, and this voltage is used as a signal to be detected. Resistor 26 and transistor 27 constitute a level shift circuit, which increases the voltage at node 25 to a certain level to generate the voltage at node 28 between resistor 26 and transistor 27. It is to be understood that transistor 27 is diode-connected, i.e., its base and collector are short-circuited. Resistor 29 and transistor 30 form a voltage level detecting circuit. The resistance value of resistor 29 is set to ensure the following operation. Namely, in the case where transistor 31 is disregarded, a voltage which is half the supply voltage is developed at the collector of transistor 30 in accordance with the bias voltage developed at node 28 while motor 19 is normally winding-up the film. With this resistance value setting of resistor 29, transistor 31, when the base thereof is connected to the collector of transistor 30 as shown, is biased by the collector voltage of transistor 30 to become conductive during normal film wind-up.

Next, assume that the rotation of motor 19 is forced to stop, causing the current flow to resistor 24 to increase and the voltage level at node 25 to be raised by 20mV, for example, and that this causes the voltage level at node 25, i.e., the base voltage of transistor 30 to increase. In response to the increase in the voltage level at node 28, the collector voltage of transistor 30 increases to be double the original level, whereby the voltage drop caused by resistor 29 becomes almost equal to the supply voltage. Thus, the bias voltage for transistor 31 becomes almost zero, cutting off transistor 31. Thus, transistor 31 is turned on and off for the normal motor rotation and the motor rotation failure, respectively. It should be understood that the voltage level detecting circuit of FIG. 3 is an extremely simple arrangement consisting of resistor 29 and transistor 30, and compensates for temperature fluctuations in cooperation with diode-connected transistor 27, thus being very effective for practical use.

Figure 4:
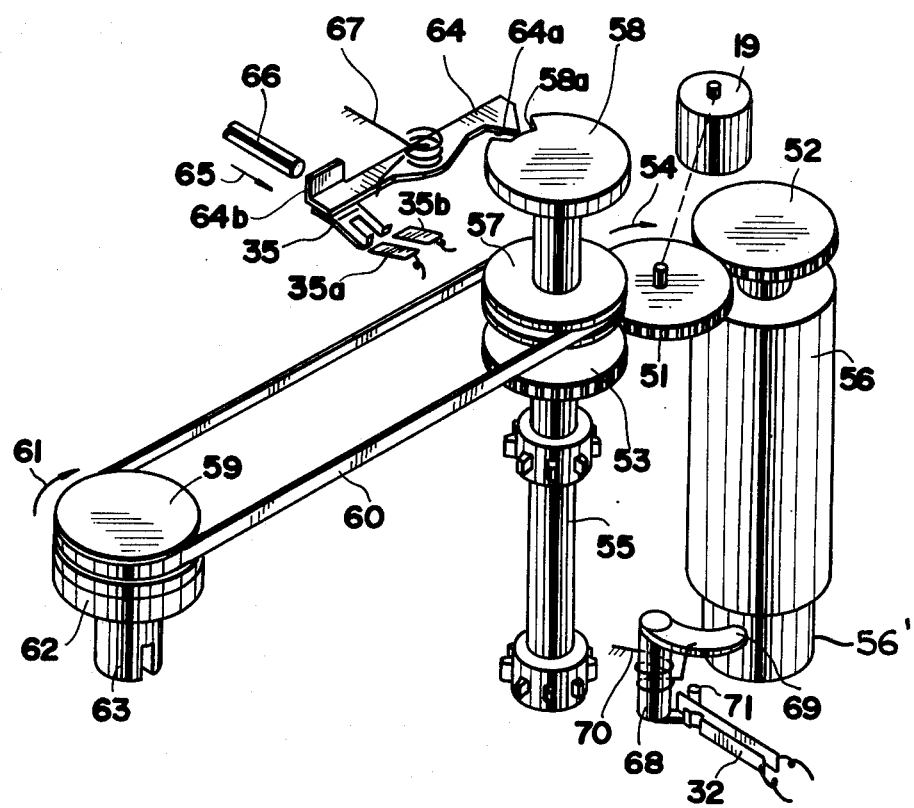
FIG. 4 is a perspective view of a film wind-up and rewinding mechanism taken along with the circuitry of FIG. 3.

Next, when the leader portion of a film has been wound around spool 56 shown in FIG. 4 and the film is positioned for exposure (one frame overlaps an exposure aperture, not shown), switch 32 is closed by film sensing means 68 carried by spool 56 to detect the film. Switch 33 of FIG. 3 is closed when a camera back cover is closed, and switch 34 interconnected with a film counter mechanism is opened when the film is loaded into the camera and wound up to position "1" for the initial frame exposure. In other words, switch 34 is opened when the film counter indicates the value of "1" or more. Switches 32, 33 and 34 are series-connected, through which the supply voltage is applied to a circuit to be described later. With the loaded film and the camera back cover closed, switches 32, 33 and 34 are initially closed, causing transistor 41 to turn on in a manner to be described later, and switch 21 is changed to contact 21b, whereby the film is automatically wound up to the initial exposure frame position. Switch 35 is closed upon termination of exposure, as described later, and is opened upon completion of a film wind-up by a single frame and camera shutter setting.

A circuit made up of transistors 37 through 41 and resistors 41 through 48 energizes electromagnet 23 upon termination of exposure, changing switch 21 to contact 21b for supplying current to motor 19 so that it rotates in the direction of a film wind-up. In addition, the circuit energizes electromagnet 22 when the film has been wound up to the last position, causing film wind-up failure due to over-tension of the film, so that switch 21 is changed to contact 21a. In this condition, electromagnet 23 is not energized to leave switch 20 at contact 20b, whereby the motor rotation is inverted for automatic film rewinding. Capacitor 36, connected in parallel to transistor 31 and resistor 42, functions as a delay means which turns on transistor 37 with a slight time lag when transistor 31 is inverted from its On state to the Off state. The delay means prevents any accidental stopping of motor 19 upon start of the power supply to motor 19. More particularly, start-up current equal in value to that of the forced motor rotation stop due to film wind-up failure flows immediately after the start of the power supply to motor 19 and this start-up current would interrupt the power supply to motor 19 without the delay means. For example, assuming that the motor is driven at 3V, approximately 200mS is required for the motor to reach a suitable current level for normal film wind-up operation after the start of rotation. Therefore, the circuit constants of capacitor 36 and resistor 42 are set so that transistor 37 turns on after the lapse of time slightly longer than the 200mS. Furthermore, the delay means also serves as a mis-operation preventing means which keeps transistor 37 in the Off state even when transistor 31 is instantly turned off due to any noise.

Transistors 37 and 38 include self-maintaining functions. When transistor 31 turns off and transistor 37 turns on once, the On state thereof is self-maintained with the assistance of transistor 38. With transistor 37 on, transistors 38, 39 and 40 are all turned on, while transistor 41 is turned off. In this case, switches 20 and 21 are changed to contacts 20b and 21a, respectively, and the current is supplied to motor 19, causing the same to rotate in the reverse direction for film rewinding. When a film has been rewound and retracted from the exposure aperture (not shown), switch 32 is opened and the power supply to electromagnet 22 is cut off, whereby switch 20 is changed to contact 20a to stop motor 19. Thus, automatic film rewinding is completed.

The following description pertains to the film wind-up/rewinding mechanism. Referring to FIG. 4, drive force is transmitted through a gear train (not shown) to idle gear 51 engaged with spool gear 52 and sprocket gear 53. When idle gear 51 rotates in the clockwise direction of arrow 54, sprocket gear 53 is rotated counterclockwise to rotate sprocket 55 therewith. The film is advanced by the rotation of sprocket 55 to be wound around spool 56. At this time, the camera shutter (not shown) is set. A small diameter portion 56' formed on the lower part of spool 56, is covered with the film wound around spool 56. Film detecting lever 69 on film sensing means 68 is biased by spring 70 so that the lever tip abuts upon the small diameter portion or the film wound therearound. In addition, switch 32 is closed with operating pin 71 integrally rotatable with film detecting lever 69 when the tip of film detecting lever 69 abuts upon the film, while it is opened when the tip of film detecting lever 69 abuts upon small diameter portion 56'. It should be noted that spool gear 52 and spool 56 are frictionally engaged with each other in a known manner. Furthermore, sprocket gear 53 is integrally connected to pulley 57 and cam plate 58, both of which rotate integrally with sprocket gear 53. Pulley 57, integral with sprocket gear 53, and film rewinding pulley 59 are connected to one another by belt 60 for rotation in the same direction. One-way clutch 62 is provided to transmit the rotating force of pulley 59 to fork 63 only when pulley 59 rotates in the direction of arrow 61, i.e., in the film rewinding direction. Fork 63 engageable with the core of a film cartridge chamber is integrally supported by clutch 62. Cam plate 58 is formed with notch 58a, with which engaging portion 64a formed on one arm of lever 64 is engageable at the position shown in FIG. 4. Attached to the other arm of switch lever 64 are the movable piece of switch 35 and upstanding projection 64b. Signal pin 66 shifts in the direction of arrow 65 upon termination of exposure to push bent portion 64b. It should be noted that switch lever 64 is biased clockwise by spring 67. Moreover, signal pin 66 shifts in the direction opposite to arrow 65 immediately before the completion of single film wind-up.

When the shutter is released and exposure is completed in a well-known manner after the film has been wound up to the exposure position, switch lever 64 is rotated counterclockwise by signal pin 66, causing engaging portion 64a to be retracted from notch 58a so that the movable pieces of switch 35 may come in contact with contacts 35a and 35b. Thus, motor 19 rotates to start film wind-up, as described above. During film wind-up, engaging portion 64a of switch lever 64 is retracted to the position where it slides on the periphery of cam plate 58. Since signal pin 66 has been retracted from projection 64b immediately before the completion of a film wind-up, switch lever 64 rotates clockwise under the action of spring 67 and engaging portion 64a engages notch 58a of cam plate 58 which is positioned as shown in FIG. 4, whereby switch 35 is opened. Transistor 41 turns off and switch 21 is changed to contact 21a, thereby cutting off the current flow to motor 19, whereby a film wind-up is completed. The operation described above is repeated until the film is wound up to the last frame.

When further wound up upon termination of exposure of the last frame, motor 19 is forced to stop due to over-tension of the film. In this case, signal pin 66 remains projected to push switch lever 64 in the counterclockwise direction. Due to the forced rotational stopping of motor 19, the circuit of FIG. 3 is electrically shifted to the stage of film rewinding, as described above, whereby the rotation of motor 19 is inverted and pulley 59 starts to rotate clockwise, as shown by arrow 61. The rotation of pulley 59 is transmitted to fork 63 through clutch 62 for film rewinding. When the film is rewound from spool 56, film detecting lever 69 of film sensing means 68 abuts upon the small diameter portion on spool 56 so as to open switch 32. With switch 32 opened, electromagnet 22 is de-energized and switch 20 is changed to contact 20a, whereby motor 19 is short-circuited to suddenly stop and film rewinding is completed.

The self-maintained states of transistors 37 and 38 are released when a power switch (not shown) is opened or when a film wind-up lever (not shown) is manually operated and switch 35 is opened upon completion of a film wind-up and camera shutter setting operation.

In the above embodiment, the forced motor rotational stopping during film wind-up operation is electrically detected to cut the power supply to motor 19. However, a modification of the embodiment is available to cut off the power supply to the motor by electrically detecting the completion of film rewinding. In other words, the embodiment detects a motor current increase due to the forced stopping of the motor rotation. In contradistinction thereto, the modification detects a motor current reduction due to decreased loads to the motor upon completion of film rewinding. For example, with the circuit of FIG. 2, the reference level of the reference voltage generating circuit is set to such a level as 560 mV, slightly lower than the level, e.g. 580mV, developed at node 12 during normal film wind-up. With this setting, switch 7 may be opened by relay circuit 18 through voltage comparator 17 which detects that the voltage at node 12 drops below the reference level.

According to the present invention, a voltage level developed at the node between a motor and a resistor connected in series to the motor is shifted towards the threshold level of a transistor for controlling switching thereof. Therefore, even with the voltage at the node set to a very low level, it is possible to detect the forced stopping of the motor rotation based on the slight variation in voltage level at the node. Furthermore, since the voltage at the node can be set to a very low level, power consumption caused by the resistor during normal film wind-up can be minimized, thereby making the most of a power supply source for the motor drive.

It is, therefore, desired that the present invention not be limited to the embodiments specifically described, but that it include all such modifications and variations as would be obvious to those of ordinary skill in this art. The scope of our invention should be determined by the equivalence of the various terms as recited in the following annexed claims.

What is claimed is:

1. A camera film drive motor control device comprising:
    a film drive motor for film wind-up and/or film rewinding, the motor current varying with the variation in the load of said motor;
    a resistor connected in series with said motor so that a voltage commensurate with the motor current appears at a node between said motor and said resistor;
    a level shift circuit connected to said node for shifting the voltage level at said node by a given constant level to generate a voltage signal for switching operation of a transistor;
    a voltage detecting circuit which detects the level of said voltage signal to generate a signal to stop electric power supply to said motor when the voltage signal represents a given relationship with respect to a given reference voltage level as a result of the variation in the motor current.

2. A camera film drive motor control device as defined in claim 1, wherein said voltage detecting circuit includes a reference voltage generator for generating a reference voltage signal and a voltage comparator adapted to receive said voltage signal and said reference voltage signal for the comparison thereof.

3. A camera film drive motor control device as defined in claim 2, wherein said reference voltage generator and said level shift circuit include semiconductive elements, respectively, which have common temperature characteristics.

4. A camera film drive motor control device as defined in claim 1, wherein said voltage detecting circuit includes a transistor for receiving said voltage signal across the base and emitter thereof, and the given reference voltage level is the voltage level required for said transistor to be turned on.

5. A camera film drive motor control device as defined in claim 1, further comprising a relay including a switch connected in series to said motor and an electromagnet responsive to said signal from said voltage detecting circuit to open said switch.

6. A camera film drive motor control device as defined in claim 5, further comprising delay means for delaying the transmission of said signal from said voltage detecting circuit to said electromagnet by a given duration which is longer than the duration required for said motor to rotate at a constant speed after electric power is supplied to said motor.

7. A camera film drive motor control device as defined in claim 4, wherein said voltage detecting circuit further includes a resistor connected to the collector of said transistor and adapted to generate said signal at a node between the collector of said transistor and said resistor to stop the electric power supply to said motor.

* * * * *